United States Patent [19]

Bogaerts et al.

[11] Patent Number: 5,119,702
[45] Date of Patent: Jun. 9, 1992

[54] BRAKE LATHE

[75] Inventors: Leo C. Bogaerts, Antioch; John W. Murphy; John S. Norman, both of Waukegan, all of Ill.

[73] Assignee: Ammco Tools Inc., LaVergne, Tenn.

[21] Appl. No.: 188,894

[22] Filed: May 2, 1988

[51] Int. Cl.$^5$ ............................................. B23B 3/00
[52] U.S. Cl. ....................................... 82/117; 82/118; 82/138
[58] Field of Search ................ 82/2 A, 4 A, 2 R, 118, 82/117, 138

[56] References Cited

U.S. PATENT DOCUMENTS

| | | | |
|---|---|---|---|
| 4,215,603 | 8/1980 | Jones | 82/4 A |
| 4,506,570 | 3/1985 | Wood et al. | 82/4 A |
| 4,510,828 | 4/1985 | Bogaerts et al. | 82/2 A |
| 4,523,499 | 6/1985 | Aldridge | 82/4 A |

*Primary Examiner*—Bruce M. Kisliuk
*Assistant Examiner*—Lawrence Cruz
*Attorney, Agent, or Firm*—Edmond T. Patnaude

[57] ABSTRACT

A brake lathe for drum and disc rotor brakes for grinding the inside cylindrical surface of a brake drum and machining the opposite parallel surfaces of a disc rotor. The lathe includes rotating spindle output shaft extending along an axis of the lathe housing. The spindle is driven by a motor which translates an endless belt over a V-belt pulley. A pair of cog belts respectively connect an intermediate pulley to the V-belt pulley and a taper lock bushing mounted on the spindle shaft. This arrangement reduces the motor speed to the desired spindle output speed and eliminates the need for an idler shaft. A first cross-feed slide is mounted in a direction transverse to the axis of the brake housing on a first side thereof for advancing the inboard and outboard cutters toward and away from the opposite parallel surfaces of a disc rotor concentrically mounted on the output shaft. A second cross-feed slide is mounted adjacent the axis of the housing and parallel thereto on the opposite side of the housing relative to the first slide and is adjustable from the first side of the housing. The second slide advances its cutter against the inside surface of the brake drum visible from the first side of the housing. Accordingly, an operator need not lean over the axis of the housing when adjusting the depth of cut of the brake drum.

5 Claims, 4 Drawing Sheets

BRAKE LATHE

BACKGROUND OF THE INVENTION

This invention relates to a brake lathe for drum and disc rotor brakes for grinding the inside cylindrical surface of a brake drum and for machining the opposite parallel surfaces of a disc rotor and, more particularly, to a brake lathe for use in automotive repair shops.

Brakes lathes for resurfacing brake drums and disc rotors are well known and have been used in the art. These lathes commonly utilize a rotating spindle provided along an axis of the brake lathe housing and which accepts at one end thereof the brake device to be machined. The other end of the spindle is driven by a source of power such as a motor. A cutting tool is provided on a moveable platform attached to the lathe so as to advance the cutting tool into the brake drum or disc rotor. The depth of cut can be adjusted by moving the tool platform or by a depth-of-cut adjustment on the tool itself. These known brake lathes have the disadvantage that the cutting tool or boring bar which is normally used to resurface or grind the inside cylindrical surface of the brake drum is located on a mounting surface or platform which is disposed between the operator and the axis of the lathe housing. Accordingly, when the operator needs to adjust the depth of cut for work on a brake drum or to otherwise observe the cutter operation, the operator must lean over the lathe to view the cutting operation which takes place along the horizontal radius of the brake drum located on the operator's side of the lathe. This procedure is awkward and, therefore, the adjustment or observation is difficult to perform. Further, in combination brake-drum and disc-rotor lathes, the location of the guide surface or platform for the boring bar interferes with the placement of inboard and outboard cutters which are utilized to machine the opposite parallel surfaces of a disc rotor and which are also located between the operator and the brake lathe housing.

These and other disadvantages are overcome by the present invention wherein there is provided a brake lathe for use with both brake drums and disc rotors which permits the operator to view the cutting operation of a brake drum machining without leaning over the machine. Further, the brake drum and disc rotor cutting tools are advantageously provided on opposite sides of the brake lathe housing. Still further, the present invention also provides separate platforms for brake drum and disc rotor operations which are independent of one another.

SUMMARY OF THE INVENTION

Briefly, a brake lathe for grinding the inside cylindrical surface of a brake drum and for machining the opposite parallel surfaces of a disc rotor is provided. The lathe includes a lathe housing and a rotating spindle output shaft extends along an axis of the housing for mounting and concentrically rotating one of the brake drum or disc rotor about the shaft. A first slide is mounted transversely of the axis of the housing on a first side of the housing for advancing inboard and outboard cutters toward and away from the disc rotor respectively about opposite parallel surfaces thereof. A second slide is mounted parallel to the axis on the opposite side of the housing for advancing a brake drum cutter against an inside surface portion of the brake drum at the opposite side of the housing.

A further feature of the present invention provides a belt drive for a lathe having a spindle driven by a motor shaft. The belt drive comprises a motor pulley for coupling to the motor shaft and a first idler pulley for mounting on the spindle for free rotation about the spindle. A first pulley is mounted to the idler pulley for rotation therewith, and a first belt connects the motor pulley to the first pulley. A second pulley is mounted to the idler pulley for rotation therewith, and a second idler pulley is mounted on an axis parallel to and spaced apart from the spindle. A third pulley is mounted to the second idler pulley for rotation therewith, and a second belt connects the second pulley to the third pulley. A fourth pulley is mounted to the second idler pulley for rotation therewith, and a fifth pulley is mounted to the spindle for rotation therewith. A third belt connects the fourth pulley to the fifth pulley.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
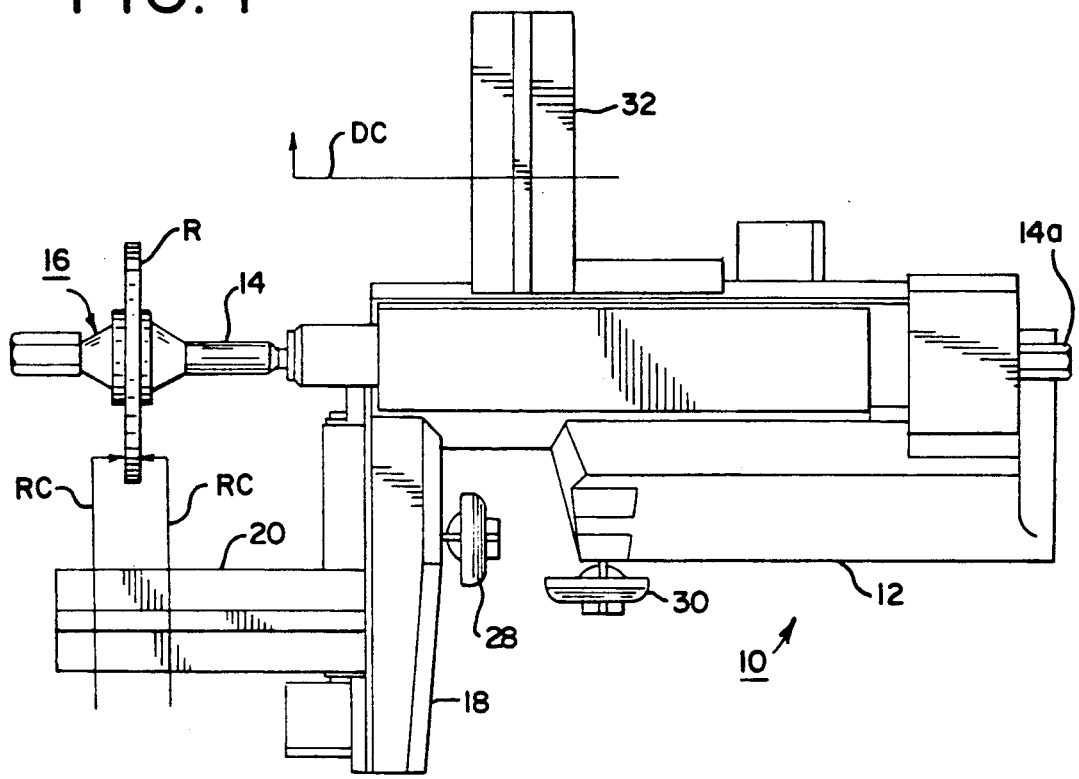
FIG. 1 is a top view of the brake lathe in accordance with the principles of the present invention shown in conjunction with an exemplary disc rotor.
Figure 2:
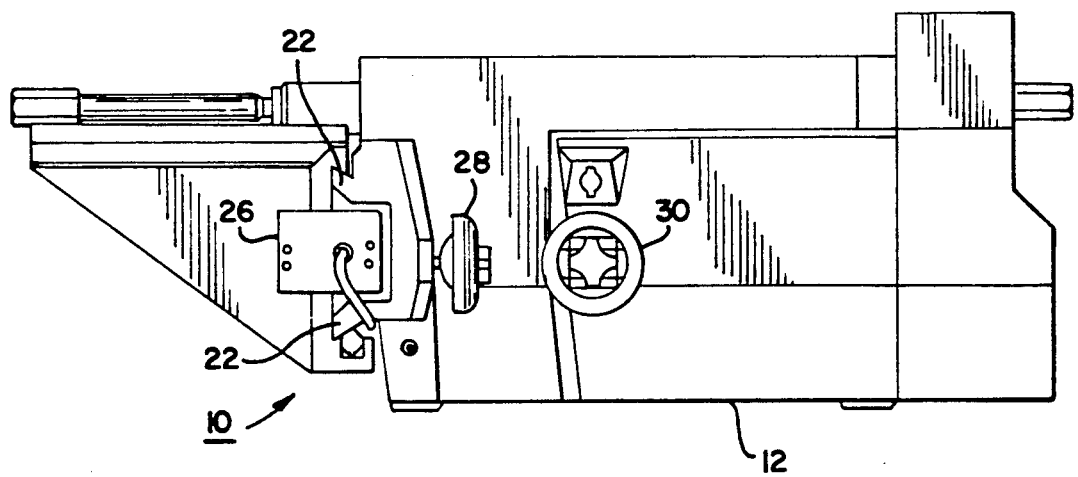
FIG. 2 is a front view of the brake lathe in accordance with the present invention and as illustrated in FIG. 1.
Figure 3:
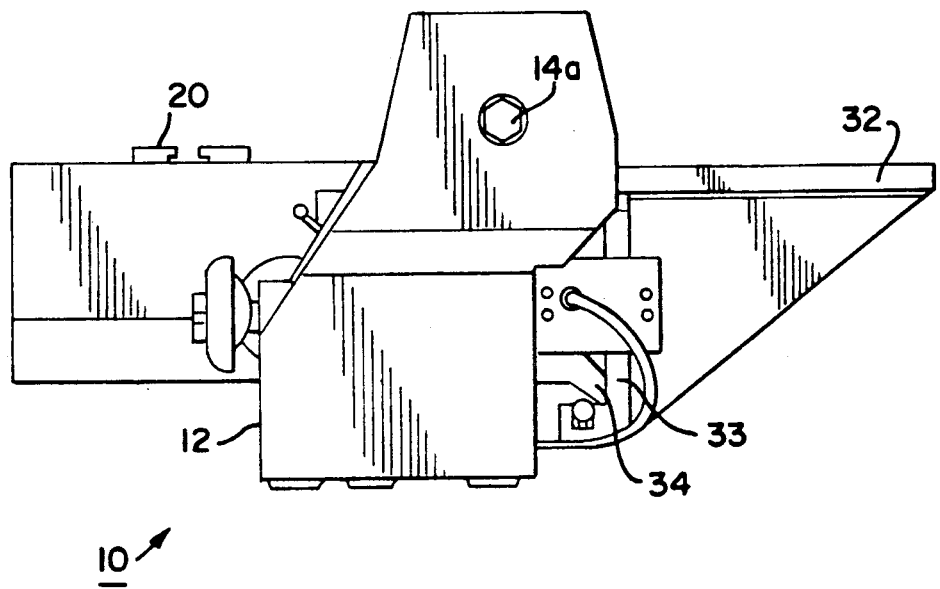
FIG. 3 is a right side view of the brake lathe corresponding to the previous drawing figures.

Referring now to FIG. 1 there is shown a top view of the brake lathe in accordance with the present invention. Brake lathe 10 includes a housing shown generally at 12 which includes a source of power or a motor as will be more fully explained hereinafter. A spindle 14 is provided along an axis of housing 12. The spindle extends outwardly of the housing to mount and accept a workpiece such as a disc rotor R which is secured to the projecting end of spindle 14 by means of a suitable clamping and arbor arrangement 16. The other end 14a of spindle 14 is adapted to be coupled to a source of power such as a motor. Housing 12 includes a first slide 18 which carries a guide surface or tool mounting platform 20. Platform 20 mounts a pair of disc-rotor cutters symbolically represented at RC in FIG. 1. Slide 18 is adapted for movement toward and away from the axis of housing 12 by means of ways 22 which are fixedly mounted to housing 12 as best illustrated in FIG. 2. That is, slide 18 is adapted to be advanced toward and away from the axis of housing 12 and therefore workpiece or disc rotor R by means of a drive unit 26 which is suitably coupled to slide 18. The initial or starting position of slide 18 is adjusted by a hand wheel 28 which sets the initial position of the cutting tip of cutting tools RC. Still referring to FIGS. 1 and 2, it can be seen that lathe 10 includes a second hand wheel 30 which is utilized to adjust the position of a second slide and its associated guide surface or platform 32 as will be explained more fully hereafter with reference to FIGS. 4 and 5. Platform 32 is adapted to receive a drum cutter symbolically represented as DC in FIG. 1 for engaging the inside cylindrical surface of a disc drum. The movement of platform 32 is along the central or longitudinal axis of housing 12. Referring now to FIG. 3 there is shown a right side view of brake lathe 10 of the previous drawing figures. It can be seen that platform 32 is attached to a second slide 33 which is slidably attached to ways 34 which are fixedly attached to housing 12 of brake lathe 10.

An important feature of the present invention provides a significant improvement to and a simplification of the motor drive for the lathe as will now be described.

Figure 4:
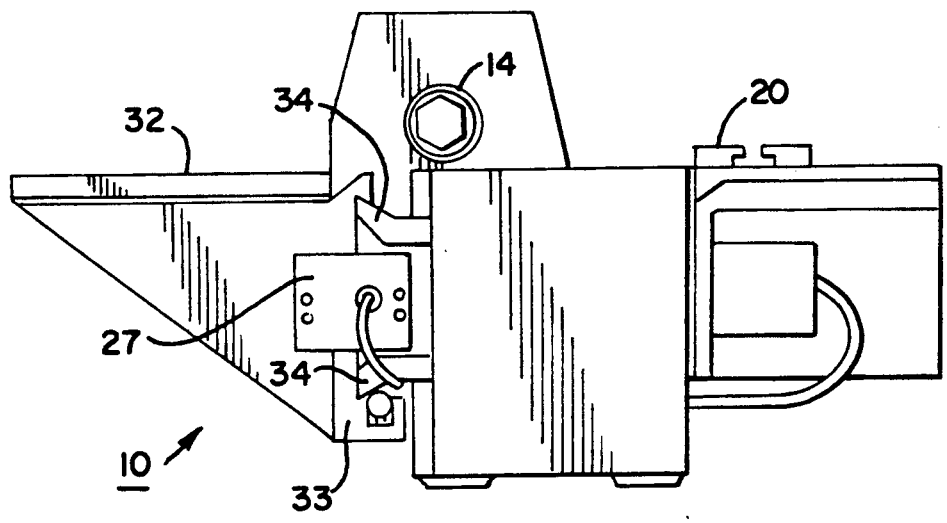
FIG. 4 is a left side view of the brake lathe of the previous drawing figures.
Figure 5:
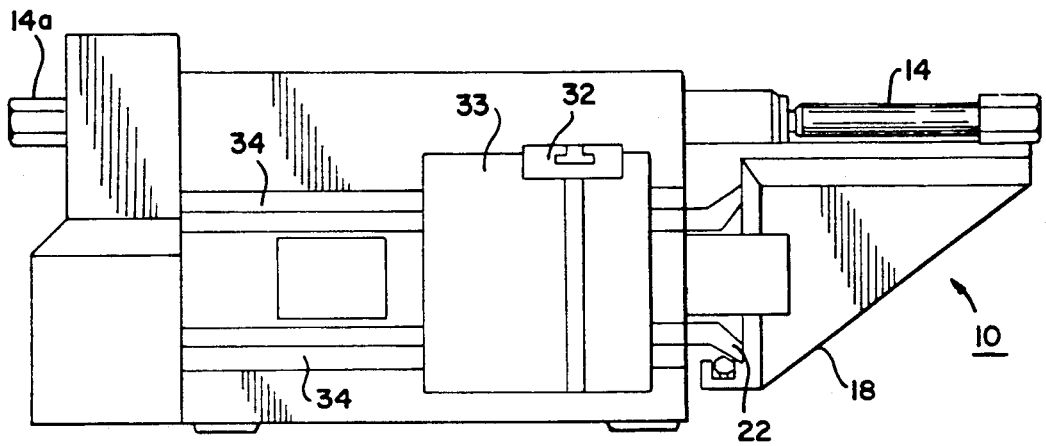
FIG. 5 is a rear view of the brake lathe.
Figure 6:
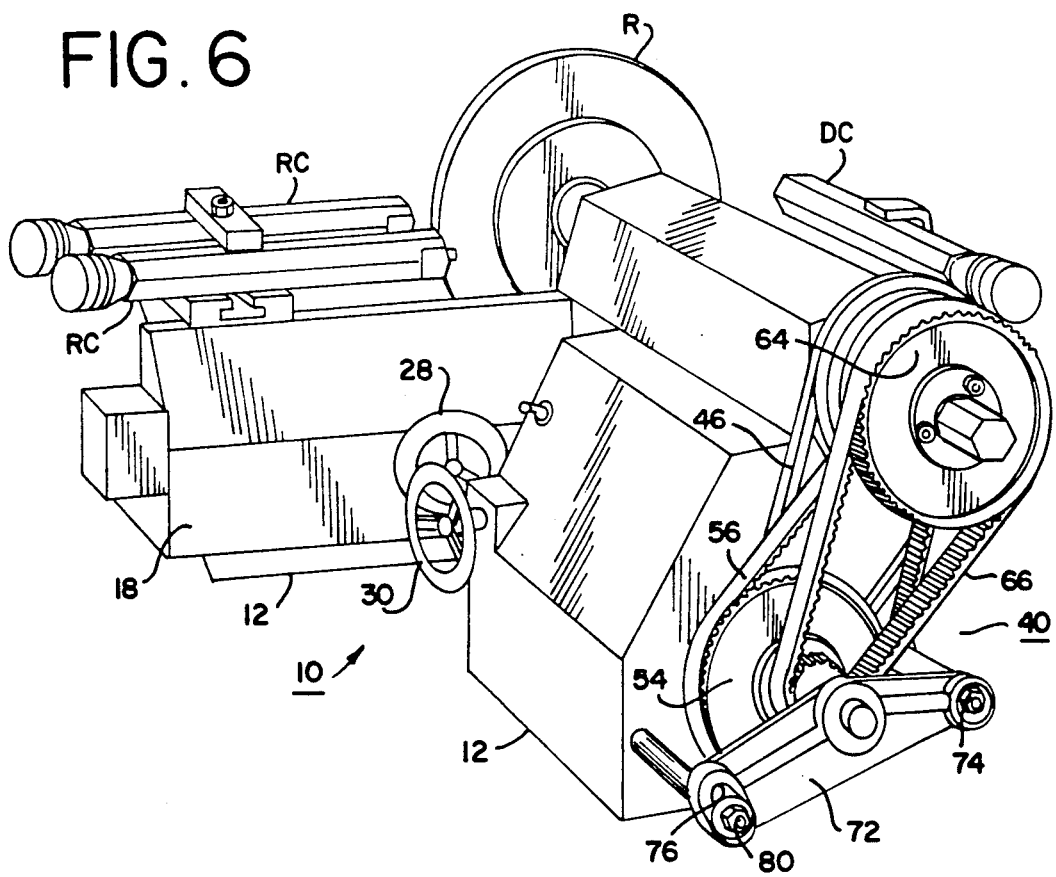
FIG. 6 is a perspective view of the brake lathe in accordance with the present invention shown in conjunction with the cutting tools, a disc rotor and a drive mechanism in accordance with a further feature of the present invention.
Figure 7:
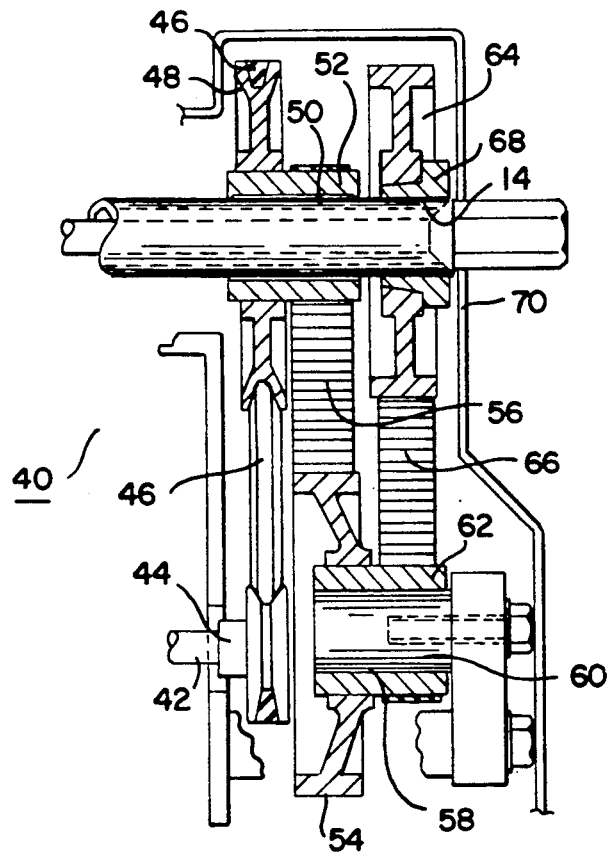
FIG. 7 is a plan view in partial section of the drive mechanism illustrated in FIG. 6; and, FIG. 8 is a side view of the drive mechanism illustrated in FIG. 7.
Figure 8:
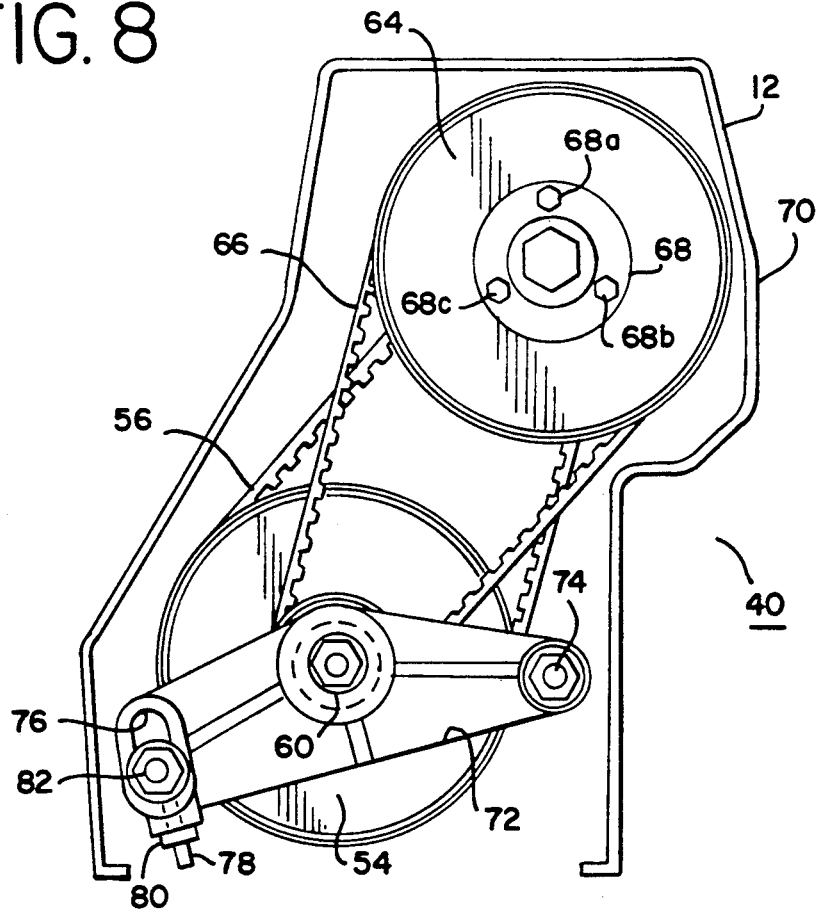

Referring now to FIGS. 4 and 5 there are shown left side and rear views, respectively, of brake lathe 10 of the previous drawing figures. It can be seen that slide 32 includes a drive motor 27 which is essentially identical to drive motor 26 as previously described. Referring now to FIG. 6 there is shown a perspective view of the brake lathe 10 of accordance with the teachings of the present invention. Brake lathe 10 in FIG. 6 further includes a motor drive or power source shown generally at 40 which includes a motor output shaft 42 as best illustrated in FIG. 7. Shaft 42 is mounted to a pulley 44 which accepts a V-belt 46 which in turn drives a V-belt pulley 48. Pulley 48 is suitably journalled to an idler pulley 50 for rotation therewith. Idler pulley 50 freely rotates about spindle 14 without imparting any motion thereto. Idler pulley 50 carries a cog belt gear 52 which is coupled to a cog belt pulley 54 of larger diameter by way of a cog belt 56. Cog pulley 54 is suitably journalled to a second idler pulley 58 which freely rotates about a shaft 60 and which is journalled to a second cog wheel pulley 62. Pulley 62 is coupled to a larger diameter cog pulley 64 by way of a cog belt 66. Pulley 64 is fixedly mounted to spindle 14 by way of a tapered sleeve bearing 68 which is threadedly fastened to pulley 64 and which wedgingly engages spindle 14. A cover 70 suitable encloses drive 40 to prevent accidental contact with the moving members therein. As best illustrated in FIG. 8, shaft 60 is carried by a bracket 72 which is pivotably mounted at pivot point 74 and which is adapted to adjust the tension on cog belts 56 and 66 by means of a slotted portion 76 and a set of fasteners 78, 80 and 82. That is, by loosening threaded nut 82 and adjusting the position of threaded rod 78 the tension on the cog belts readily can be adjusted. It can be seen that the tapered sleeve 68 is fixedly fastened to pulley 64 by means of threaded fasteners 68a, 68b and 68c. The respective diameters of the cog belt pulleys are selected so as to reduce the RPM output of the motor (not shown) to the desired spindle speed. In currently preferred practice, this arrangement reduces a motor shaft output speed at shaft 42 of 1700 RPM to 110 RPM at spindle 14.

It will now be appreciated by those skilled in the art that the brake lathe in accordance with the principles of the present invention provides a brake lathe wherein the machining of a brake drum is accomplished along a horizontal radius located on the side of the lathe which is opposite to the side of the work station or operator's position. Further, since separate and independent slides are respectively provided for, the brake drum and disc rotor operations, stacking of the slides or tool positioning platforms is advantageously avoided. Since the slides are separate and independent, both slides can be mounted directly to the main frame or housing of the lathe. It will also be appreciated by those skilled in the art that the all-belt drive feature provides a speed reduction drive system utilizing only two center lines--i.e., the motor shaft and the spindle. Thus, three speed reductions are provided on merely two center lines.

What has been taught, then, is a brake lathe and which overcomes the disadvantages of the prior art. The forms of the invention illustrated and described herein are but preferred embodiments of these teachings. They are shown as illustrations of the inventive concepts, however, rather than by way of limitation, and it is pointed out that various modifications and alterations may be indulged in within the scope of the appended claims.

What is claimed is:

1. A brake lathe for grinding the inside cylindrical surface of a brake drum and for machining the opposite parallel surfaces of a disc rotor, said lathe comprising, in combination:
   a lathe housing having a front side and a rear side;
   a rotating spindle output shaft extending along an axis of said housing between said front and rear sides for mounting and concentrically rotating one of said brake drum and disc rotor about said shaft;
   a first slide mounted transversely of said axis on the front side of said housing for advancing an inboard cutter and an outboard cutter toward and away from said disc rotor respectively along opposite parallel surfaces thereof; and,
   a second slide mounted parallel to said axis on the rear side of said housing for advancing a brake drum cutter against the inside surface portion of said brake drum on said rear side of said housing.

2. The brake lathe according to claim 1, said first slide and said second slide include upper mounting surfaces for respectively mounting said cutters to said slides.

3. The brake lathe according to claim 1, wherein said slides are respectively mounted to the front and rear sides of said housing.

4. The brake lathe according to claim 1, including manually adjustable control means mounted on said front side of said housing for respectively controlling the positions of said slides.

5. The brake lathe according to claim 4, wherein said first slide is movably mounted to said housing perpendicular movement relative to said axis and wherein said second slide is movably mounted to said housing for parallel movement related to said axis.

* * * * *

UNITED STATES PATENT AND TRADEMARK OFFICE
CERTIFICATE OF CORRECTION

PATENT NO. : 5,119,702

DATED : June 9, 1992

INVENTOR(S) : Leo Bogaerts et al

It is certified that error appears in the above-identified patent and that said Letters Patent is hereby corrected as shown below:

Column 4, at line 59, after "housing" insert --for--.

Signed and Sealed this

Thirty-first Day of August, 1993

Attest:

BRUCE LEHMAN

Attesting Officer    Commissioner of Patents and Trademarks